Oct. 3, 1944.                T. P. McCLOSKEY, JR                2,359,658
                              FLUID LEVEL INDICATOR
                              Filed Jan. 10, 1944            3 Sheets-Sheet 1
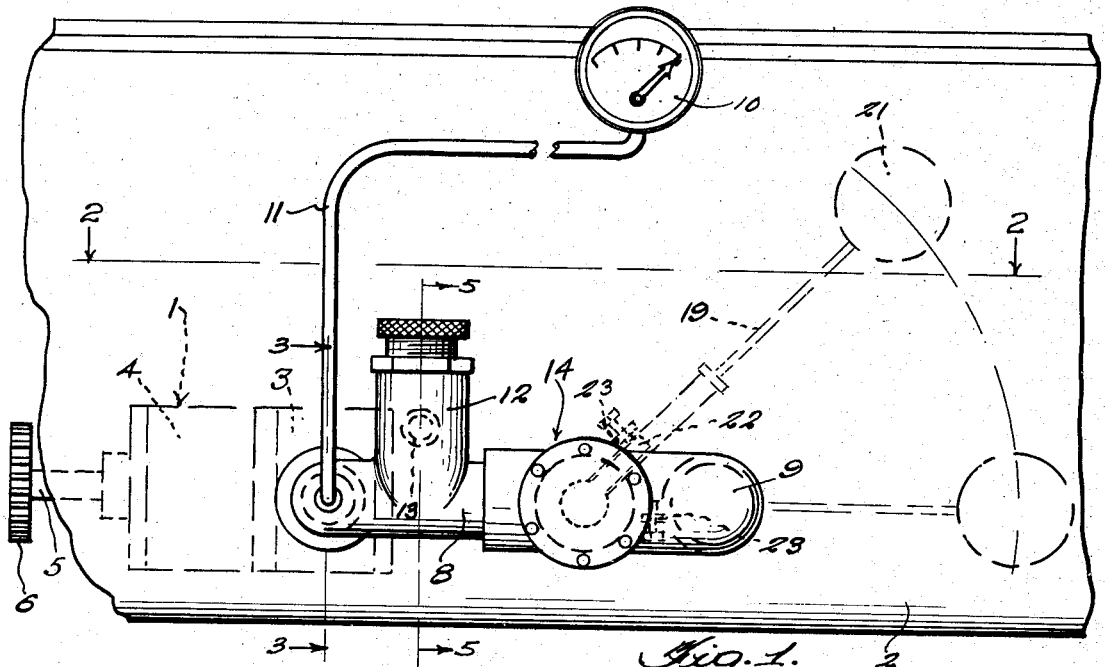
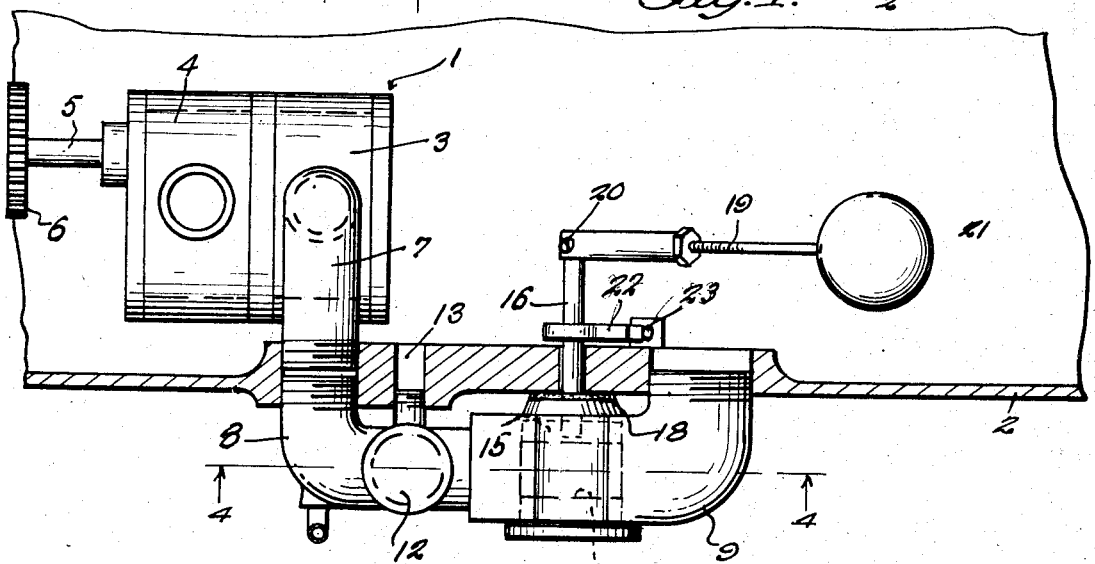
Inventor
THOMAS P. McCLOSKEY, JR
By Clarence A. O'Brien
and Harvey B. Jacobson
Attorneys Oct. 3, 1944.    T. P. McCLOSKEY, JR    2,359,658
FLUID LEVEL INDICATOR
Filed Jan. 10, 1944    3 Sheets-Sheet 2

Inventor
THOMAS P. McCLOSKEY, JR

By Clarence A. O'Brien
and Harvey B. Jacobson
Attorneys

Oct. 3, 1944.     T. P. McCLOSKEY, JR     2,359,658
FLUID LEVEL INDICATOR
Filed Jan. 10, 1944     3 Sheets-Sheet 3

Inventor
THOMAS P. McCLOSKEY, JR

By *Clarence A. O'Brien
and Harvey B. Jacobson*
Attorneys

Patented Oct. 3, 1944

2,359,658

UNITED STATES PATENT OFFICE 2,359,658

FLUID LEVEL INDICATOR

Thomas P. McCloskey, Jr., Anniston, Mo.

Application January 10, 1944, Serial No. 517,712

2 Claims. (Cl. 73—317)

The present invention relates to new and useful improvements in fluid level indicators, particularly for the crankcases of internal combustion engines, although it will be understood, of course, that the device may be used for any other purpose for which it may be found adapted and desirable.

The primary object of the invention is to provide, in a fluid level indicator of the type comprising a pressure responsive gauge, novel float-operated means for varying the pressure to said gauge in accordance with the rise or fall of the level of the fluid.

Another very important object of the invention is to provide an improved fluid level indicator of the character described which may be expeditiously and accurately adjusted to meet various conditions.

Still another very important object of the invention is to provide a fluid level indicator of the character set forth which may be installed for operation in an engine crankcase or other container without the necessity of making material structural alterations therein.

Other objects of the invention are to provide an improved fluid level indicator which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing an indicator constructed in accordance with the present invention mounted on the crankcase of an internal combustion engine.

Figure 2 is a view in horizontal section, taken substantially on the line 2—2 of Figure 1.

Figure 3:
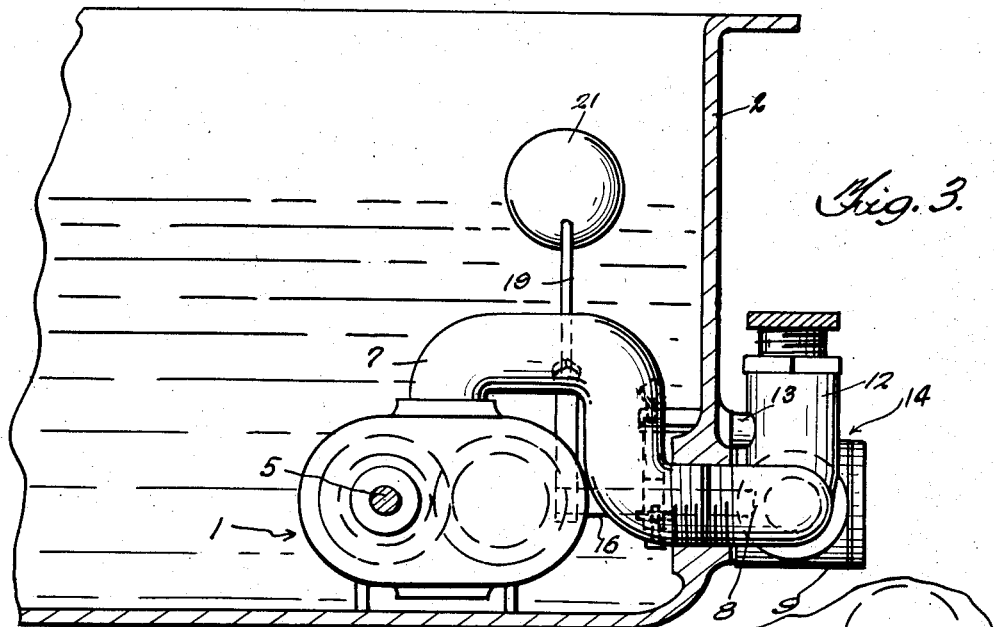
Figure 3 is a cross sectional view through a portion of the crankcase, taken substantially on the line 3—3 of Figure 1.

Referring now to the drawings in detail, it will be seen that the embodiment of the invention which has been illustrated comprises a pump unit which is designated generally by reference numeral 1, said pump unit being mounted in an engine crankcase 2. The unit 1 includes duplicate gear pumps 3 and 4, the latter for forcing lubricating oil from the crankcase 2 through the usual pressure lubricating system of the engine. The unit 1 further includes a drive shaft 5 which is common to the pumps 3 and 4, said drive shaft having fixed thereon a gear 6. The gear 6 may be driven in any suitable manner from the cam shaft of the engine.

Communicating with the outlet 7 of the pump 3 for receiving the oil or the fluid therefrom is a pressure chamber 8 in the form of an elbow. The outlet end of the pressure chamber 8 is connected to the crankcase 2 by an elbow 9. A pressure-responsive gauge 10, located at any suitable point, is connected to the pressure chamber 8 by a line 11. Rising from the pressure chamber 8 is an adjustable relief valve 12 which discharges into the crankcase 2, as at 13.

Figure 4:
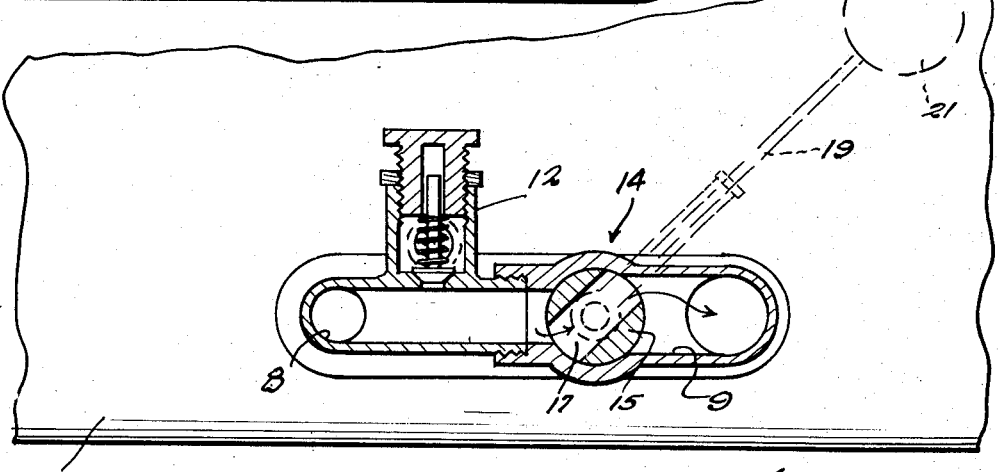
Figure 4 is a view in vertical longitudinal section, taken substantially on the line 4—4 of Figure 2.
Figure 5:
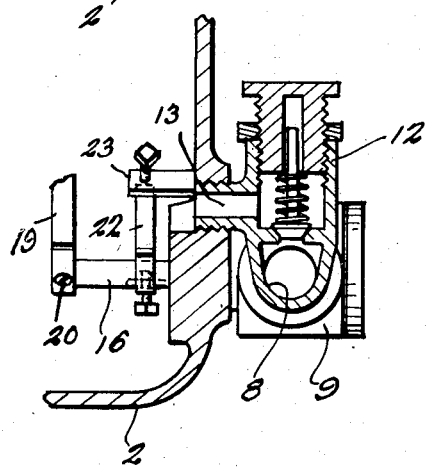
Figure 5 is a cross sectional view, taken substantially on the line 5—5 of Figure 1.
Figure 6:
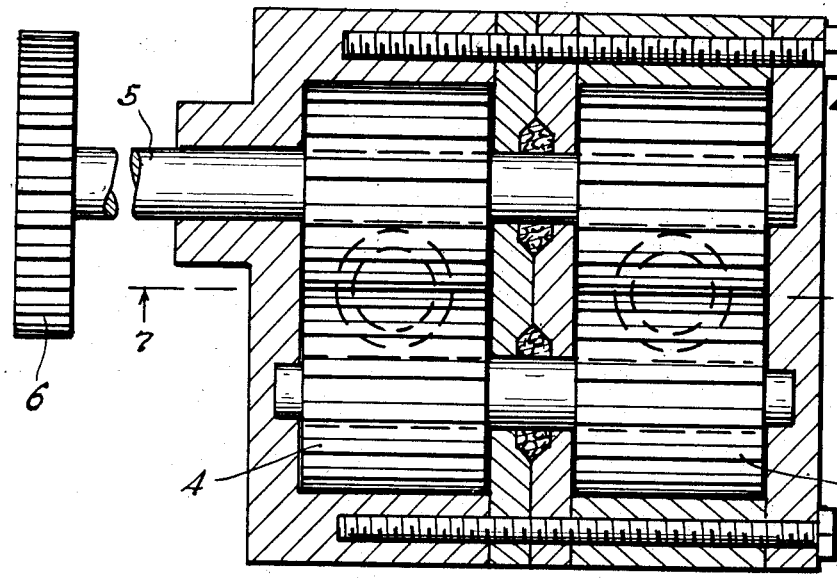
Figure 6 is a view in horizontal section through the pump unit.
Figure 7:
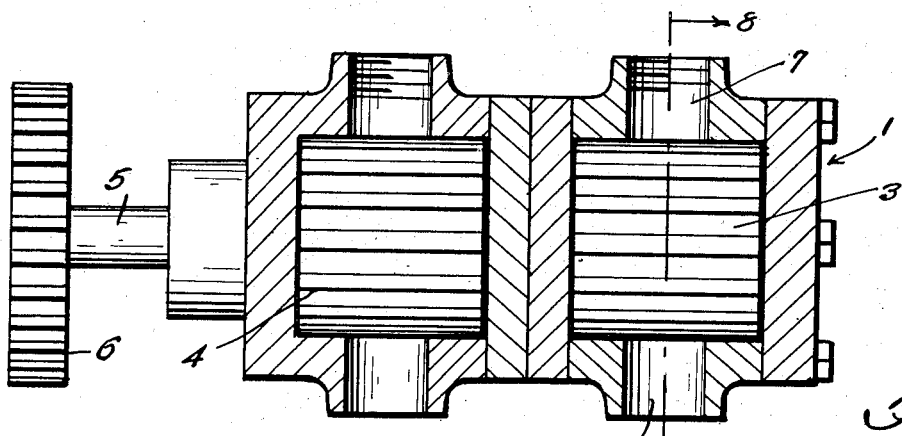
Figure 7 is a vertical sectional view through the pump unit, taken substantially on the line 7—7 of Figure 6.
Figure 8:
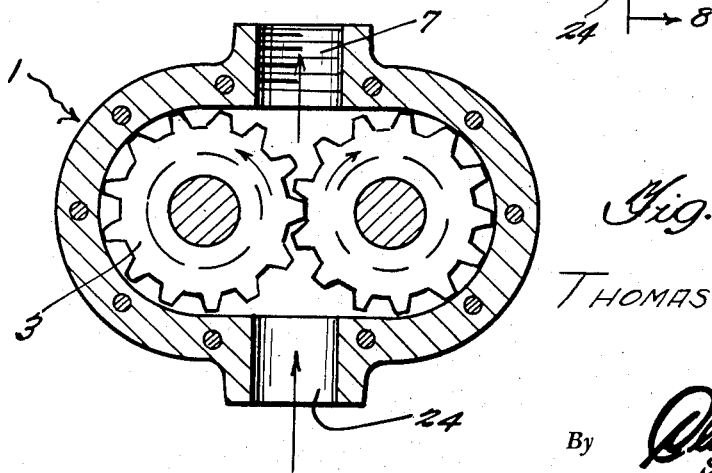
Figure 8 is a cross sectional view, taken substantially on the line 8—8 of Figure 7.

The elbow 9 constitutes the body or casing of a pressure control valve which is designated generally by reference numeral 14. The valve 14, in the embodiment shown, includes a rotary core or plug 15 which is journaled transversely in the member 9 and which has fixed therein a shaft 16 which projects rotatably into the crankcase 2 through the adjacent side wall thereof. A passage 17 (see Fig. 4) is provided in the rotary core 15 for the flow of fluid from the pressure chamber 8. A washer or gasket 18 is provided on the shaft 16 for preventing leakage between the inner end of the core 15 and the opposed side wall of the crankcase 2.

Mounted on the inner end portion of the valve shaft 16 for vertical swinging movement in the crankcase 2 is a longitudinally adjustable or extensible arm 19. A float 21 is provided on the free end of the extensible arm 19.

Also fixed on the valve shaft 16, adjacent the side wall of the crankcase 2, is a relatively short arm 22. Adjustable stops 23 are mounted in the crankcase 2 for engagement by the arm 22 for positively limiting swinging movement of the float 21 in opposite directions.

It is thought that the operation of the device will be readily apparent from a consideration of the foregoing. Briefly, when the oil in the crankcase 2 is at the correct level, float 21 is in raised position and the valve 14 is closed. With the engine running, the pump 3 is driven thereby and oil is drawn from the crankcase 2 into said pump 3 through the intake 24 thereof. This oil enters the chamber 8 from the pump 3 under pressure. However, as the valve 14 is closed, maximum pressure is exerted by the oil on the gauge 10 through the line 11 for indicating that the crankcase is full or substantially so. The oil escapes from the pressure chamber 8 and returns to the crank case 2 through the relief valve 12. However, as the level of the oil in the crankcase drops, the float 21 is lowered. Thus, the valve 14 is partially opened, as suggested in Figure 4 of the drawings, and the pressure is lowered in the chamber 8, which pressure drop is registered by the gauge 10. As the oil level and the float 21 continue to drop, the valve 14 is opened wider and the gauge 10 continues to show the fall of the pressure in the chamber 8. It will accordingly be seen that the level of the oil in the crankcase 2 controls or regulates the pressure to the gauge 10. In this manner the level of the oil may be accurately ascertained by simply observing the gauge 10.

It is believed that the many advantages of a fluid level indicator constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. In combination with a container for the reception of a fluid, a fluid level indicator including a pressure chamber having an inlet and an outlet communicating with the container, means in the container connected to the inlet for forcing fluid under pressure into the chamber from said container, a pressure-responsive gauge connected to the chamber, a valve controlling the outlet from the chamber to the container, a float for actuating the valve operable in the container, and a relief valve connecting the pressure chamber to the container.

2. The combination with an engine crankcase for the reception of lubricating oil, of an oil level indicator comprising a pump mounted in the crankcase and having its intake side communicating therewith for receiving oil therefrom, a pressure chamber mounted on the crankcase and communicating with the outlet side of the pump for receiving the oil under pressure therefrom, an elbow connecting the pressure chamber to the crankcase for returning the oil to said crankcase, a rotary valve in the elbow for controlling the flow of oil therethrough from the pressure chamber to the crankcase, a float for actuating the valve operable in the crankcase, a pressure-responsive gauge connected to the pressure chamber, and a relief valve connecting the pressure chamber to the crankcase.

THOMAS P. McCLOSKEY, Jr.